(12) United States Patent
Nakamura et al.

(10) Patent No.: US 7,540,985 B2
(45) Date of Patent: Jun. 2, 2009

(54) METHOD OF PRODUCING A POLYURETHANE FOAM MOLDED ARTICLE

(75) Inventors: Masafumi Nakamura, Suita (JP); Masaru Suzuki, Sanda (JP); Hitoshi Maeda, Osaka (JP)

(73) Assignee: Bayer MaterialScience AG, Leverkusen (DE)

( * ) Notice: Subject to any disclaimer, the term of this patent is extended or adjusted under 35 U.S.C. 154(b) by 181 days.

(21) Appl. No.: 11/302,838

(22) Filed: Dec. 14, 2005

(65) Prior Publication Data

US 2006/0134398 A1 Jun. 22, 2006

(30) Foreign Application Priority Data

Dec. 17, 2004 (JP) ............................. 2004-366267

(51) Int. Cl.
*B29C 44/06* (2006.01)
(52) U.S. Cl. .................. 264/45.5; 264/51; 264/53; 264/54
(58) Field of Classification Search ............... 264/45.1, 264/45.5, 46.4, 51, 53, 54, 255
See application file for complete search history.

(56) References Cited

U.S. PATENT DOCUMENTS

| | | | |
|---|---|---|---|
| 3,873,656 A * | 3/1975 | Garner | 264/55 |
| 4,014,966 A * | 3/1977 | Hanning | 264/45.1 |
| 4,968,724 A | 11/1990 | Mascioli | 521/103 |
| 5,437,822 A | 8/1995 | Wada et al. | 264/45.5 |
| 6,294,248 B1 | 9/2001 | Madan et al. | 428/318.6 |
| 6,352,658 B1 | 3/2002 | Chang et al. | 264/46.4 |

FOREIGN PATENT DOCUMENTS

| | | |
|---|---|---|
| EP | 0 995 568 A1 | 4/2000 |
| JP | 5-59146 | 3/1993 |
| WO | 01/32392 A1 | 5/2001 |

OTHER PUBLICATIONS

Polyurethanes World Congress, Sep. 29-Oct. 1, 1997, pp. 185-191, H. Adolf et al, "Metering Attachments for Blowing Agent for Foam Applications like Pentane and Carbon Dioxide $CO_2$".

* cited by examiner

*Primary Examiner*—Leo B Tentoni
(74) *Attorney, Agent, or Firm*—Noland J. Cheung; N. Denise Brown; John E. Mrozinski, Jr.

(57) ABSTRACT

A method of producing a polyurethane molded article is provided, in which one molding machine which can provide distinctly polyisocyanate component(s) and two kinds of polyol components is used, and prior to completion of the feed of a first polyurethane mixture liquid containing a polyisocyanate and a polyol component without a blowing agent into a mold, a second polyurethane mixture liquid containing a polyisocyanate and a second polyol component with a blowing agent is fed into the mold. The method produces, in a single stage, a polyurethane foam molded article having the skin or high density portion selectively formed on portions of the molded article actually requiring them, where the proportions of the skin and the high density portion and the foamed core can be varied freely.

10 Claims, No Drawings

METHOD OF PRODUCING A POLYURETHANE FOAM MOLDED ARTICLE

FIELD OF THE INVENTION

The present invention relates to a method for producing a polyurethane molded article which has both a high density part and a low density foamed core part in any proportion.

BACKGROUND OF THE INVENTION

A polyurethane foam molded article having a high density surface layer (hereinafter referred to as a "skin") has very good surface properties in applications other than those where it is covered by a skin made of other material, such as a mattress and cushion. Therefore, a flexible polyurethane foam and a semi-rigid polyurethane foam are often used in furniture, automobile interior components such as an arm rest, a steering wheel and a shift lever knob, shoe soles, and sporting goods. Rigid polyurethane foam has many applications such as an imitation lumber and a structural material.

Articles such as an automobile steering wheel and a shoe sole which require high wear resistance, for example, are usually made of a molded member covered by a skin on the surface thereof (or on the bottom in the case of shoe), with the inner portion (core) desirably having a lower density for better touch feeling.

Saddles of bicycles are also typically covered by a skin because a high strength is required of the surface with which the body of the rider makes contact and the portion where the saddle is mounted on the bicycle, with the core desirably having a lower density and softness for better ride comfort. In order to finish the painted surface with better appearance, the surface layer is required to have a high density.

In case of a structural material made of a rigid polyurethane foam, too, it is common to provide a skin in order to finish the painted surface of the molded article with better appearance, while it is required to make the core from a foamed material of low density in order to reduce the weight of the molded article.

A polyurethane foam molded article will have higher commercial value and find wider application, if a skin is formed at only a portion where it is required during use and the core is made of a foamed material having lower density and lower hardness in accordance to the required performance.

As a method for foaming a polyurethane, there is known a technology using a foaming machine in which carbon dioxide or a so-called low boiling point liquid such as fluorinated hydrocarbon is used as the blowing agent and a colorant component as a third component is metered to be provided by the foaming machine. Foaming machines specially designed for producing foamed polyurethane products by metering and mixing at least three components are also commercially available.

However, this equipment and these molding techniques presuppose that a molded article having uniform density, uniform hardness and uniform composition in any part of the molded article can be obtained. Therefore, the object of the foaming machine is to feed a raw material having a uniform composition including a blowing agent from start to finish during feeding the raw material.

*Plastics*, Vol. 24, No. 8, p. 118 discloses that a molded article having an skin layer, so-called a polyurethane integral skin foam can be molded in one time by using a liquid blowing agent having a low boiling point near room temperature such as a fluorinated hydrocarbon, based on the difference of foaming reactions caused by the temperature difference between an internal core part and a surface layer contacting with the mold at the molding and that this molding process is a known technology.

A method for producing a polyurethane foam molded article by using a blowing machine of polyurethane resin is described in *Polyurethane World Congress* '97, p. 185, wherein components required for foaming, such as an isocyanate, a polyol, a catalyst, a crosslinking agent and a low boiling point blowing agent such as fluorocarbons, are charged separately by metering pumps from respective tanks into the mixing head.

*Urethane Technology*, October/November 1994 discloses a method using water which is the most common as the blowing agent of the polyurethane resin. However, it is very difficult to form a sufficient skin on the polyurethane molded article by this method.

JP-A-5-59146 discloses a method for imparting a skin to a polyurethane resin molded article wherein the reactivity of the raw materials is increased by using a large amount of a urethane reaction catalyst or a cross-linking agent while the viscosities of raw materials for the polyurethane are increased.

JP-A-5-305629 discloses a method using a pyrolysis type blowing agent. JP-A-6-1820 discloses a method wherein water in the form of a hydrate salt is added to control the reaction between water as a blowing agent and an isocyanate.

In the technology disclosed by *Plastics*, Vol. 24, No. 8, p. 118, a ratio of the skin layer to the foamed core is almost constant, the skin cannot be formed at only parts on which the skin is required to be formed in the molded article, the density cannot be changed and the hardness of each part cannot be changed.

As in the production method disclosed in *Polyurethane World Congress* '97 p. 185, the molding technologies, the equipment and the like for metering and mixing at least three these components to produce the polyurethane foamed molding articles are designed such that a constant ratio of raw materials including a low boiling liquid blowing agent are continuously metered, mixed and fed. Therefore, a ratio of the skin to the foamed core is approximately constant. Thus, the skin cannot be formed at only parts on which the skin is required to be formed in the molded article, the density cannot be changed and the hardness of each part cannot be changed.

*Urethane Technology*, October/November 1994, JP-A-5-59146, JP-A-5-305629 and JP-A-6-1820 disclose methods for forming a skin on a polyurethane foam molded article. However, a molded article having a satisfactory skin layer is not obtained. Moreover, although it is possible to produce a stable polyurethane foam molded article in which the ratio of the skin to the foamed core is constant, it is impossible to produce a polyurethane foam molded article wherein the ratio of the skin to the foamed core is varied, and the skin or the high density is provided on only portions on which the skin or the high density is actually required for the molded article.

Thus, although the conventional methods are capable of molding the polyurethane molded article having uniform performance, such the conventional methods cannot produce the desired molded article because it is difficult to form the skin selectively on a surface of the molded article actually requiring the skin and to change density or hardness of each site by varying arbitrarily the proportions of the skin to the foamed core layer. There are no satisfactory methods.

SUMMARY OF THE INVENTION

The present invention provides a method for producing, in a single stage, a polyurethane foam molded article having the skin selectively formed on portions of the molded article actually requiring the skin, wherein the proportions of the skin to the low density foamed core can be varied arbitrarily, and the density or hardness of each site can be changed.

DETAILED DESCRIPTION OF THE INVENTION

The present invention will now be described for purposes of illustration and not limitation. Except in the operating examples, or where otherwise indicated, all numbers expressing quantities, percentages, OH numbers, functionalities and so forth in the specification are to be understood as being modified in all instances by the term "about." Equivalent weights and molecular weights given herein in Daltons (Da) are number average equivalent weights and number average molecular weights respectively, unless indicated otherwise.

The present invention provides a method of producing a polyurethane molded article, from (a) one or two polyisocyanate components, and (b) two polyol components, the method involving providing a molding machine which can provide distinctly the polyisocyanate component(s) and two polyol components, feeding a first polyurethane mixture liquid containing a polyisocyanate and a first polyol component without a blowing agent into a mold with the molding machine, and for at least 0.1 seconds prior to completion of feeding the first polyurethane mixture liquid, feeding a second polyurethane mixture liquid containing a polyisocyanate and a second polyol component with a blowing agent into the mold.

The present invention makes possible the production of a polyurethane foam molded article having an average density of 0.2 to 0.8 g/cm$^3$, wherein the molded article has a skin and/or a high density part and a low density foamed core selectively on portions of the molded article actually requiring them and the proportions of the skin and/or the high density part to the low density foamed core can be arbitrarily changed. In addition, because the skin or the high density part is provided selectively on a portion of the molded article which is actually required, the density of the molded article can be made lower while maintaining performance similar to that of the art.

In the present invention, there can be used a polyurethane resin blowing machine equipped with tanks which contain the components required for molding a polyurethane resin, for example, a polyisocyanate component and a polyol component and, as required, a blowing agent, metering pumps for metering and pumping the components and a mixing head for mixing the components.

According to the present invention, various blowing machines can be used for the polyurethane foam molding machine, such as a low-pressure blowing machine wherein the polyisocyanate component and the polyol component are metered and charged at a pressure from 0.1 to 5 MPa, preferably approximately 2 MPa, into a mixing head (a reaction and mixing apparatus which mixes the components and charges the mixture into a mold) and are mixed by a mixer provided in the mixing head, and a high pressure polyurethane blowing machine which mixes the components through collision at a high pressure of 10 MPa or higher, preferably in a range from 12 to 25 MPa in a mixing head. The high pressure polyurethane blowing machine is particularly preferred.

It is necessary that the polyurethane molding machine used in the present invention can feed the two distinct polyurethane mixture liquids into the mold. It is necessary that the polyurethane molding machine independently has pumps which meter and feed separately at least three components into one mixing head when one molding machine is used for one kind of polyisocyanate component and two kinds of polyol components or it is necessary that the molding machine independently has pumps which meter and feed separately four kinds of components into one mixing head when one molding machine is used for two kinds of polyisocyanate components and two kinds of polyol components.

A combination of two polyurethane molding machines can be used for molding, although two mixing heads are necessary when the two molding machines are combined. An inlet of the mold for the polyurethane mixture liquids in a RIM process is preferably only one, in order that the second polyurethane mixture liquid for the low density portion foamed layer core pushes and expands uniformly the first polyurethane mixture liquid from a flow center around which the first polyurethane mixture liquid for skin and high density portion flows.

It is preferable to equip a timer which can control the switch from the first polyurethane mixture liquid to the second polyurethane mixture liquid, that is, the function for start and end of charge into the mixing head with an increment of 0.1 seconds, preferably 0.01 seconds.

In RIM (reactive injection molding) process where the polyurethane mixture liquid is injected through an injection gate into a closed mold, the first polyurethane mixture liquid which has been charged in advance stays around the injection gate, and is pressed so as to fill the entire space of the mold by the pressure of injecting the mixture of the second polyurethane mixture liquid to be charged subsequently or by the pressure generated by the foaming reaction. Because the body of the first polyurethane mixture liquid receives a resistance to its movement on the surface thereof which makes contact with the mold surface, the second polyurethane mixture liquid flows through the central portion of the inner space of the mold under a tunnel effect in accordance to the kinetics of liquid flow, while the first polyurethane mixture liquid which is not in contact with the mold surface also moves to fill the inner space while making contact with the mold surface. The first polyurethane mixture liquid which makes contact with the mold surface forms the skin on the surface of the molded article. The second polyurethane mixture liquid which is charged later is blown in the mold since it contains principally the blowing agent, so as to form the foamed core having a density lower than that of the skin made of the first polyurethane mixture liquid.

The proportion and the thickness of the formed skin in the molded article can be controlled according to the quantity of the first polyurethane mixture liquid which was earlier injected. The quantity of the first polyurethane mixture liquid is determined based on the proportion and the thickness of the required skin. When the molded article has a complex shape having the varying thickness and width, because the first polyurethane mixture liquid may occupy not only the surface but also the whole in the direction of the thickness, the second polyurethane mixture liquid may flow in the only core portion in which the second polyurethane mixture liquid flows easily. It is not always necessary for the first polyurethane mixture liquid to cover the whole surface of the molded article. The first polyurethane mixture liquid may cover the only necessary portion (for example, at least 30%, particularly at least 50% of the entire surface).

As the time for feeding the first polyurethane mixture liquid is longer, the skin formed can be thickened and a larger quantity of the first mixture liquid can be provided on the necessary site. The quantity of the first reaction mixture liquid which is injected before injecting the second polyurethane mixture liquid is preferably at least 10% by weight, for example, from 10 to 50% by weight, of the total quantity of the first polyurethane mixture liquid and the second polyurethane mixture liquid injected into the mold.

However, before the completion of the reaction, and before the earlier injected first polyurethane mixture liquid loses its fluidity, it is necessary to inject the second polyurethane mixture liquid. When the first polyurethane mixture liquid has the fluidity, it easily spreads in the mold.

The injection time of the first polyurethane mixture liquid is preferably at least 0.1 seconds, more preferably, from 0.15 seconds to 3.0 seconds. A time interval from the finish of injecting the first polyurethane mixture liquid to the start of injecting the second polyurethane mixture liquid is preferably shorter, and the finish and the start may be continuous. For example, when both first and second polyurethane mixture liquids are used as the polyisocyanate component, these can be fed continuously and the polyol component can be changed.

It is also possible to inject the first polyurethane mixture liquid into the mold after finishing the injecting of the second polyurethane mixture liquid into the mold, so that only the first polyurethane mixture liquid can remain near and at the injection gate. As a result, a high density part can be formed in this site. When an unnecessary injection gate in the product is cut off, the foamed core having larger cell size does not appear on the cut surface, thus solving problems inherent in the art such as painting failure and low heat resistance.

The proportion of the high density portion near and at the injection gate and the proportion of the high density portion formed near the molded article which contacts with the injection gate are determined in accordance to the amount of the first polyurethane mixture liquid injected into the mold after completing the injection of the second polyurethane mixture liquid into the mold.

The amount of the first polyurethane mixture liquid injected into the mold after completing the injection of the second polyurethane mixture liquid into the mold is preferably at least 1.0% by weight, more preferably, from 1.0 to 5.0% by weight of the total amount of the first polyurethane mixture liquid and the second polyurethane mixture liquid injected into the mold.

Also when the injection of the first polyurethane mixture liquid is started after the ending of the injection of the second polyurethane mixture liquid, a time interval from the finish of the injection of the second polyurethane mixture liquid to the start of the injection of the first polyurethane mixture liquid is preferably shorter and the finish and the start may be continuous. For example, when both the first and second polyurethane mixture liquids are used as the polyisocyanate component, these can be fed continuously and the polyol component changed.

It is also necessary to control the discharging rate of the second polyurethane mixture liquid. When the discharging rate is too high, the first polyurethane mixture liquid which has been injected in advance may be washed off by the pressure of the second polyurethane mixture liquid which is injected later. The discharging rate is preferably 800 g/second or lower, more preferably, from 50 to 800 g/second, with the rate dependent on the size of the molded article.

With respect to the viscosities at a temperature of 25° C. of the polyisocyanate component and polyol component in the first polyurethane mixture liquid for forming a high density part, the viscosity of the polyisocyanate component is preferably not more than 2,000 mPa·s, more preferably from 30 mPa·s to 1,000 mPa·s, and the viscosity of the polyol mixture is preferably not more than 10,000 mPa·s, more preferably from 500 mPa·s to 5,000 mPa·s. Where the viscosities are in such ranges, because the first polyurethane mixture liquid is easily pushed and flowed by the second polyurethane mixture liquid for forming a lower density part, the first polyurethane mixture liquid easily spreads in the mold. The viscosities at a temperature of 25° C. of the polyisocyanate component and the polyol component in the second polyurethane mixture liquid preferably have the same ranges as those of the polyisocyanate component and the polyol component in the first polyurethane mixture liquid.

Total duration of injection into the mold is controlled preferably to 1.0 second or longer, for example, from 1.2 to 10 seconds. By controlling the total duration of injection into the mold to at least 1.5 seconds, it is advantageously to easily change from the first polyurethane mixture liquid to the second polyurethane mixture liquid, that is, to easily formulate the proportion of the skin layer to the low density part on each part of the molded articles. It is made possible to control the selector timer for starting the injection and stopping the injection so as to change the proportions of the skin to the foamed layer core. It is possible to obtain a molded article which has clearly formed skin and foamed core.

To obtain skins of high density on both of the top and bottom surfaces of the molded article in the RIM molding process under the conditions described above, the thickness of the molded article is preferably 20 mm or less, more preferably 10 mm or less and most preferably from 2 to 8 mm. It becomes easier to form the skin on practical surfaces of the molded article and to make the sprue slug with a high density as a whole, when the thickness is not larger than 10 mm. Although there may be a portion having no foamed core layer where it is 2 mm or less in thickness, the present invention is not restricted by the range of thickness described above in case a molded article having portions of different thickness is to be formed.

The injection gate is preferably located at the bottom of the mold (lower side of the molded article). When the injection gate is preferably located at the bottom of the mold, the first polyurethane mixture liquid and the second polyurethane mixture liquid which have been injected advantageously move from the injection gate toward the end of the mold while filling the inner space of the mold in the direction of thickness.

When a mold of open injection type without injection gate is used, the first polyurethane mixture liquid which has been charged in advance is pressed so as to spread principally on the bottom surface in the entire space of the mold by the pressure generated by foaming reaction of the second polyurethane mixture liquid to be charged subsequently, so that a portion, which becomes a lower bottom of the molded article and which contacts with the mold surface, forms a skin. The second polyurethane mixture liquid forms a foamed core. The thickness and position of forming the skin of, for example, shoe soles and saddles which require a relatively thick layer of the skin on one surface corresponding to at least 50% of the total surface of the molded article can be controlled by varying the amount and injection pattern of the earlier injected first polyurethane mixture liquid.

The injection of the second polyurethane mixture liquid is stopped early, and near the end of the injection, the first polyurethane mixture liquid can be injected. For example, by changing the injection pattern of the first polyurethane mixture liquid and the second polyurethane mixture liquid to a lateral direction, it becomes possible to form the skin on the portion of the molded article where it is required and to achieve the desired arrangement of the foamed core.

Also in the open injection process, the time interval for change and the quantities of injecting the first polyurethane mixture liquid and the second polyurethane mixture liquid are preferably the same as in the RIM molding process.

Although the thickness of the molded article made by open injection process is determined by the density of the second polyurethane mixture liquid which is blown to form the core, it can also be set relatively freely. A molded article having the thickness of at least 10 mm, particularly from 10 to 200 mm, for example, 100 mm can be produced.

To form the skin on the surface of the molded article where it is required or form a high density part selectively in a particular location in the open injection process, it is desirable to maintain a fixed injection pattern so as to ensure reproducibility of the foamed portions and the proportion of the skin and the core by using a robot or the like. Where the molded article has a large surface area, it is preferable to attach a nozzle having a shape of fan (or delta) or fish tail fin to the mixing head so that the first polyurethane mixture liquid is injected while spreading from the mixing head.

Also in respect to free-rise foam which is foamed in a vessel opening in a top, by adjusting the conditions such as the time interval and the amount of injecting the first polyurethane mixture liquid and the second polyurethane mixture liquid, a foam in which the skin is formed on the foam surface (at the bottom of the expanded foam) and the foamed core having low density is formed in the internal portion can be produced.

The method according to the present invention can employ either the RIM process wherein the closed mold provided with an injection gate is used, or the open injection process without using an injection gate, the RIM process preferably being employed. The RIM process makes it easier to control the proportion of molded article surface covered by the skin under a tunneling effect, and to form the high density part, particularly near the injection gate.

According to the present invention, as described above, it is possible to use the polyurethane foam molding machine provided with the timer which can control the change of injecting the first polyurethane mixture liquid and the second polyurethane mixture liquid into the mixing head, that is, the timer of injecting them into the mold with an increment of 0.01 seconds. This makes it possible to produce a molded article which has varying proportions of the skin, the high density part and the foamed core in the RIM process, namely to form the skin only in the portion of the molded article where it is required and form a high density part in the sprue slug. It was also found that a molded article having the skin formed in the portion where it is required and a low density foamed core can be made also in the open injection process.

All of polyurethanes such as rigid urethanes, flexible urethanes and semi-rigid urethanes may be used for the polyurethanes for forming the low density core, the high density part and the skin. According to applications of the products, various urethane systems, for example, a combination of a skin of the flexible urethane elastomer and a core of the rigid urethane can be used. Furniture or interior automotive trims which have a flexible surface and a rigid core may be produced, for example, by using the combination of the skin of the flexible urethane elastomer and the core of the rigid urethane. Moreover, automotive instrument panels, door trims, rear quarter panels, cushions and furniture having pleasing touch feeling can be produced by using a system in which a structural material supports a combination of the skin of the flexible/semi-rigid elastomer and the core layer of the flexible urethane foam or semi-rigid urethane foam. Furthermore, a molded article can be produced without a painting process by using a colored weather-resistant system such as an aliphatic isocyanate urethane system for a surface portion and by using a rigid urethane having a high rigidity and containing a reinforcer for a core portion. Further, when the molded article is molded, the molded article having a skin covered by an in-mold coating material can be produced by carrying out previously the in-mold coating on the mold.

Polyurea resins wherein a minority or majority of the resin produced by using a polyol containing an amino group at the end of the polyol as an active group has a urea linkage may be used for the combinations.

The density of a free-rise foam in a cap-free vessel in an open state, which was obtained by using the first polyurethane mixture liquid containing the polyol component with substantially no blowing agent other than water which was contained during mixing the raw materials or which had been contained previously in the raw materials, is preferably at least 0.8 g/cm$^3$, and more preferably at least 0.85 g/cm$^3$. Where the density is at least 0.80 g/cm$^3$, it is also possible to satisfy performance of the high density skin formed of the first polyurethane mixture liquid.

The NCO index of the polyisocyanate component and the polyol component in the first polyurethane mixture liquid and the second polyurethane mixture liquid used (The NCO index is an index of an isocyanate to a polyol when a polyurethane is molded. The NCO index is 100 when a polyisocyanate component and a polyol component are mixed and molded at an equivalent ratio of the NCO of the polyisocyanate component to the average isocyanate-reactive active hydrogen of the polyol component) is preferably from 80 to 120.

The average density of the polyurethane foam molded article is preferably from 0.2 to 0.8 g/cm$^3$.

The polyurethane foam molded article is made of both a high density part and a low density part (namely, a foaming part). It is preferably a molded article in which the high density part has a density of at least 0.8 g/cm$^3$, e.g. from 0.8 to 1.2 g/cm$^3$, and at least 50% of the entire surface of the molded article is covered by the high density part. The density of the low density part is preferably 0.7 g/cm$^3$ or less, e.g. from 0.05 to 0.5 g/cm$^3$.

Where the high density part has a density of at least 0.8 g/cm$^3$, the performance enough to serve as the skin can be attained. When at least 50% of the entire surface of the molded article is covered by the high density part, the resulting urethane foam article has various uses such as shoe sole and saddle in which at least 50% (corresponding to one side) of the molded article may be covered by the skin.

The raw materials used for producing the polyurethane molded article in the present invention will now be described.

That is, the polyisocyanate component, and a polyol, a catalyst, a crosslinking agent and, if necessary, foam stabilizers, reinforcers and other auxiliaries used in the polyol component in the first polyurethane mixture liquid and the second polyurethane mixture liquid, and a blowing agent used for the second polyurethane mixture liquid are detailed below.

Suitable polyisocyanate components include diphenylmethane diisocyanate, polymethylene polyphenylene polyisocyanate, toluene diisocyanate, hexamethylene diisocyanate, isophorone diisocyanate, modified polyisocyanates obtained by modifying these polyisocyanates with urethane, allophanate, carbodiimide or isocyanurate, and mixtures thereof.

As the polyol used for the polyol component, there can be used polyether polyols having 2 to 6 hydroxyl groups in the molecule and an average hydroxyl group equivalent of 100 to 3,000, which are obtained by adding an alkylene oxide such as ethylene oxide or propylene oxide to hydroxyl group-containing compounds such as propylene glycol, diethylene glycol, glycerin, trimethylol-propane, pentaerythritol, sorbitol and sucrose, compounds having an amino group and a hydroxyl group such as triethanolamine and diethanolamine, or amino group-containing compounds such as ethylene diamine and diaminotoluene, or polymer polyols obtained by addition-polymerizing a vinyl compound to these polyether polyols.

There can also be used polyester polyols obtained from a polycarboxylic acid and a low molecular weight hydroxyl group-containing compound, lactone-based polyester obtained by ring-opening polymerization of caprolactone, polycarbonate polyol, polytetramethylene glycol obtained by ring-opening polymerization of tetrahydrofuran, and polyether polyamine which is obtained by aminating a hydroxyl group of polyether polyol or hydrolyzing an isocyanate prepolymer of polyether polyol, which have an average active hydrogen equivalent of 100 to 3,000.

The amount of the isocyanate component and that of the polyol component are preferably adjusted so that the isocyanate index is 80 to 120.

As the catalyst, there can be used tertiary amines such as triethylene diamine, pentamethyldiethylene triamine, 1,8-diazabicyclo-5,4,0-undecene-7, dimethylaminoethanol, tetramethylethylene diamine, dimethylbenzylamine, tetramethylhexamethylenediamine and bis(2-dimethylaminoethyl) ether; and organometallic compounds such as dibutyltin dilaurate, tin octanoate and dibutyltin diacetate.

As the crosslinking agent, there can be optionally used dihydric alcohols having a molecular weight of 62 to 300 such as ethylene glycol, propylene glycol, butanediol, hexanediol, neopentyl glycol, diethylene glycol, triethylene glycol, polyethylene glycol, dipropylene glycol and polypropylene glycol; and divalent amines such as diethyltoluenediamine, t-butyltoluenediamine, diethyldiamino-benzene, triethyldiaminobenzene and tetraethyldiaminodiphenylmethane. Polyether polyols obtained by adding an alkylene oxide to them can also be used. These crosslinking agents are described in JP-B-54-17359, JP-A-57-74325, JP-B-63-47726 and JP-B-01-34527.

As auxiliaries, there can be optionally used foam adjusting agents or foam stabilizers such as silicone-based foam stabilizers; reinforcers; surfactants (compatibilizing agents); weathering agent such as antioxidants; ultraviolet absorbers; stabilizers such as 2,6-di-t-butyl-4-methylphenol and tetrakis [methylene 3-(3',5'-di-t-butyl-4-hydroxyphenyl)propionate] methane; and colorants.

As the reinforcer, there can be optionally used fibers made of vitreous, inorganic and mineral substances, such as milled glass fiber, wollastonite fiber and processed mineral fiber; and flakes such as mica and glass flake.

The blowing agent may be previously mixed with the polyol component, or may be mixed later with the isocyanate component. Alternatively, the blowing agent may be mixed with the polyol component while simultaneously mixed with the polyisocyanate component.

As the blowing agent, there can be used water (which reacts with a polyisocyanate compound to evolve a carbon dioxide gas), carbon dioxide, fluorocarbons such as chlorofluorocarbon, hydrocarbons such as pentane and cyclopentane, and fluorinated hydrocarbons such as HCFC141b, HFC245fa and HFC365mfc according to the design of a polyurethane foaming machine. A combination of the blowing agents can also be used. A carbonate salt of an amine compound (which is dissociated upon the urethanization reaction to evolve a carbon dioxide gas) or an organic acid such as formic acid (which reacts with a polyisocyanate compound to evolve a carbon dioxide gas), as the blowing agent, can also be used. Further, air or nitrogen gas may be previously dispersed in the polyol component, for example, by using an air loading apparatus.

The blowing agent is preferably at least one of carbon dioxide, hydrocarbon, fluorinated hydrocarbon and water. The blowing agent is particularly preferably, carbon dioxide. The second polyurethane mixture liquid for forming low density portion containing the carbon dioxide as the blowing agent causes foaming on injection into a mold, resulting in low density. Therefore, it does not penetrate into the first polyurethane mixture liquid for forming high density portion injected earlier, thus forms clear interface boundary between the skin and the core layers. Particularly, on the open injection process, the second polyurethane mixture liquid remains on the upper portion of the earlier injected first polyurethane mixture liquid and does not penetrate into the first polyurethane mixture liquid, thus forms clear interface boundary between the skin and the core layers.

The following Examples and Comparative Examples further illustrate the present invention in detail. Parts in these examples are parts by weight.

EXAMPLES

Example 1

The following polyisocyanate component and polyol component were used for the first polyurethane mixture liquid.

Polyisocyanate A: Carbodiimide-modified diphenylmethane diisocyanate (NCO content: 29.0%, viscosity: 35 mPa·s/25° C.).

Polyol component A: 45 parts of polyether polyol having a hydroxyl value of 35 mg KOH/g which was prepared by addition polymerization of propylene oxide and ethylene oxide with glycerin, 45 parts of polyether polyol having a hydroxyl value of 45 mg KOH/g which was prepared by addition polymerization of propylene oxide and ethylene oxide with propylene glycol, 7 parts of monoethylene glycol, 0.9 parts of dimethylamino propylamine and 0.5 parts of a black paste (a mixture of carbon and a polyether polyol) which was used so as to change the color to black were mixed to give 20 kg of the polyol component mixture (hydroxyl value: 160 mg KOH/g, viscosity: 1,000 mPa·s/25° C.).

Polyol component A and Polyisocyanate A were mixed in the ratio weight of 100:43 and the NCO index of the mixture was 105. The resulting free-rise foam was black, and had a density of 0.90 g/cm$^3$, and its gel time (the time when the liquid almost loses its fluidity) was 34 sec.

The following polyisocyanate and polyol component were used for the second polyurethane mixture liquid.

Polyisocyanate B: Polymethylene polyphenyl polyisocyanate (NCO content: 31.0%, viscosity: 130 mPa·s/25 degrees C.).

Polyol component B: 41 parts of a polyether polyol having a hydroxyl value of 870 mg KOH/g which was produced by addition polymerization of propylene oxide with trimethylol propane, 31 parts of a polyether polyol having a hydroxyl value of 28 mg KOH/g which was produced by addition polymerization of propylene oxide and ethylene oxide with propylene glycol, 11.25 parts of monoethylene glycol, 4.26 parts of monoethanolamine, 0.5 parts of water, 1.384 parts of carbon dioxide, 1.4 parts of silicone surfactant (stabilizer for cells), 0.88 parts of pentamethyldiethylene triamine, 0.88 parts of a triethylenediamine salt catalyst and 8 parts of a compatibility improvement agent were mixed to give 20 kg of the polyol component mixture (a formulated polyol for a rigid polyurethane foam having a free-rise foam density of 0.15 g/cm³, hydroxyl value: 620 mg KOH/g, viscosity: 1,700 mPa·s/25° C.).

Polyol component B and polyisocyanate B were mixed in the weight ratio of 100:157 and NCO index of the mixture was 105. The resultant free-rise foam was yellow and had a density of 0.15 g/cm³, and its gel time was 27 sec.

Each of the polyurethane raw material components was provided in tanks of a polyurethane molding machine type HK270 which could feed four components, manufactured by Maschinenfabrik Hennecke GmbH. Pouring rate was set 550 g/sec for each of the components.

Each of the polyurethane raw material components was poured into a mold of 6 mm thickness, 30 cm width and 50 cm length, having a pouring gate of 30 cm width and 2 mm thickness at the end of the mold and set at a temperature of 60° C., under RIM molding.

The first polyurethane mixture liquid was poured for 0.35 sec (195 g poured). One second from the end of the pouring of the first polyurethane mixture liquid, pouring of the second polyurethane mixture liquid was started and the second mixture liquid was poured for 0.43 sec (237 g poured) and molded. The mold was filled. Both upper and lower surfaces of the molding article were black in about 36 cm length from the pouring gate. The remaining portion of 14 cm distance to the flow end was mostly yellow and had black lines in a direction of the flow direction. The surface of the black part had no bubble and was in an unexpanded solid state. By observation of the cross section, it was confirmed that 195 g of the black first polyurethane mixture liquid (22% in mold volume ratio) was spread to 72% of the surface of the molding article. Thickness of the black part was around 0.2 mm and 0.27 mm at the upper and lower parts near the pouring gate and around 0.4 mm and 0.5 mm at the upper and lower parts at the central part.

Example 2

The polyurethane raw material components were molded by the same method as Example 1, except that the pouring time of the first polyurethane mixture liquid was changed to 0.53 sec (290 g poured) and the pouring time of the second polyurethane mixture liquid was changed to 0.41 sec (223 g poured). The mold was filled. Both upper and lower surfaces of the molding article were black in about 45 cm from the pouring gate length and the rest of 5 cm to the flow end was mostly yellow urethane and had black lines in the flow direction. It was confirmed that 290 g of the black first polyurethane mixture liquid (32% of the volume of the mold) was spread to 95% of the surface of the molding article. By observation of the cross section, the thickness of the black part was around 0.2 mm and 0.3 mm at the upper and lower parts near the pouring gate. Distinct skin layers having a thickness of around 0.8 mm and 1.0 mm were observed at the upper and lower parts of the central part.

Example 3

The polyurethane raw material components were molded by the same method as Example 1, except that the pouring time of the first polyurethane mixture liquid was changed to 0.59 sec (320 g poured) and the pouring time of the second polyurethane mixture liquid was changed to 0.60 sec (330 g poured). The mold was filled. It was confirmed that 320 g of the black first polyurethane mixture liquid (35% of the volume of the mold) almost completely covered both the upper and lower surfaces of the molding article. By observation of the cross section, the thickness of the black part was around 0.2 mm and 0.3 mm at the upper and lower parts near the pouring gate. Distinct skin layers having a thickness of around 1.0 mm were observed at the upper and lower parts of the central part. A part of 2 cm from the flow end was almost filled with the first polyurethane mixture liquid and the core of the second polyurethane mixture liquid had a thickness of 1 mm.

Example 4

Polyol component C: 94 parts of a polyether polyol having a hydroxyl value of 28 mg KOH/g which was produced by addition polymerization of propylene oxide and ethylene oxide with glycerin, 4.2 parts of monoethylene glycol, 1.5 parts of diethanolamine, 0.7 parts of water, 0.2 parts of a surfactant, 1.2 parts of a solution of triethylenediamine in ethylene glycol and 1.0 parts of a UV absorber were mixed to give a polyol mixture (20 kg) (Hydroxyl value: 158 mg KOH/g, viscosity: 1,100 mPa·s/25° C.) was used as the polyol component in the second polyurethane mixture liquid (II).

Polyol component C and Polyisocyanate B were mixed in the weight ratio of 100:40 and NCO index 105. The first polyurethane mixture liquid was the same as that of the Example 1.

The pouring rate was set 170 g/sec for both the first polyurethane mixture liquid and the second polyurethane mixture liquid. Each of the components was poured into an open mold of 10 cm width, 20 cm length and 1 cm thickness. The first polyurethane mixture liquid was poured for 0.35 sec (60 g poured) and then the second polyurethane mixture liquid was poured for 0.25 sec (43 g poured). The mold was closed and a molding article was produced at 6 min. after closing the mold. The surface of the molding article was covered with 3 mm thickness of an unexpanded black layer and the rest portion of 7 mm thickness was an expanded core having a density of 0.30 g/cm³. Such molding article having the surface black layer and the foamed core was obtained.

Comparative Example 1

The polyurethane raw material components were molded by the same method as Example 1 except that the first polyurethane mixture liquid was poured for 0.06 sec (33 g poured) and the second polyurethane mixture liquid was poured for 0.60 sec (330 g poured). A molding article demolded from the mold after 6 min. completely filled the mold. The black part of the both the upper and lower surfaces of the molding article did not reach a part of 25 cm from the gate and the rest to the flow end was mostly yellow and had black lines along the direction of the flow. It was confirmed that the surface of the black part had no bubble but, 33 g (3.7% in mold volume ratio poured) of the black part per 900 cc of the mold did not spread to 50% of the surface of the molding article. Observation of the cross section showed that the thickness of the black part is around 0.16 mm and 0.27 mm of the upper and lower part near the pouring gate.

The inventors herein envision that the polyurethane molded articles of the present invention, such as a flexible polyurethane foam and a semi-rigid polyurethane foam may be used in furniture, automobile interior components such as an arm rest, a steering wheel and a shift lever knob, shoe soles, and sporting goods. Rigid polyurethane foams have many applications such as an imitation lumber and a structural material.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A reaction injection molding process (RIM process) for producing a polyurethane molded article with a surface layer having a density of at least 0.8 g/cm$^3$ from
   (a) one or two polyisocyanate components, and
   (b) two polyol components,
   the method comprising:
      providing a molding machine which can feed distinctly the polyisocyanate component(s) and two polyol components;
      feeding a first polyurethane mixture liquid comprising a polyisocyanate component and a polyol component without a blowing agent into a mold with the molding machine; and for from 0.1 to 3.0 seconds prior to completion of feeding the first polyurethane mixture liquid,
      feeding a second polyurethane mixture liquid comprising a polyisocyanate component and a polyol component with the blowing agent into the mold,
      wherein the total duration of the first and second feeding steps is from 1.0 to 10.0 seconds.

2. The process according to claim 1, wherein the quantity of the first polyurethane mixture liquid, to be fed before the feed of the second polyurethane mixture liquid, is at least 10 weight % of the total of the first polyurethane mixture liquid and the second polyurethane mixture liquid.

3. The process according to claim 1, wherein the first polyurethane mixture liquid is fed after the feed of the second polyurethane mixture liquid.

4. The process according to claim 3, wherein the quantity of the first polyurethane mixture liquid, to be fed after the completion of the feed of the second polyurethane mixture liquid, is at least 1.0 weight % of the total of the first polyurethane mixture liquid and the second polyurethane mixture liquid.

5. The process according to claim 1, wherein the blowing agent is at least one chosen from carbon dioxide, hydrocarbons, fluorinated hydrocarbons and water.

6. A reaction injection molding process (RIM process) for producing a polyurethane molded article with a surface layer having a density of at least 0.8 g/cm$^3$ from at least one polyisocyanate component and two polyol components, said method comprising:
      feeding into a mold from a molding machine, a first polyurethane mixture liquid comprising a polyisocyanate and a first polyol component without a blowing agent, and for from 0.1 to 3.0 seconds prior to completion of feeding the first polyurethane mixture liquid;
      feeding into the mold from a molding machine, a second polyurethane mixture liquid comprising a polyisocyanate and a second polyol component with the blowing agent; and
      curing the polyurethane molded article,
      wherein the total duration of the first and second feeding steps is from 1.0 to 10.0 seconds.

7. The process according to claim 6, wherein the quantity of the first polyurethane mixture liquid, to be fed before the feed of the second polyurethane mixture liquid, is at least 10 weight % of the total of the first polyurethane mixture liquid and the second polyurethane mixture liquid.

8. The process according to claim 6, wherein the first polyurethane mixture liquid is fed after the feed of the second polyurethane mixture liquid.

9. The process according to claim 8, wherein the quantity of the first polyurethane mixture liquid, to be fed after the completion of the feed of the second polyurethane mixture liquid, is at least 1.0 weight % of the total of the first polyurethane mixture liquid and the second polyurethane mixture liquid.

10. The process according to claim 6, wherein the blowing agent is at least one chosen from carbon dioxide, hydrocarbons, fluorinated hydrocarbons and water.

* * * * *